(12) United States Patent
Kim et al.

(10) Patent No.: US 12,305,009 B2
(45) Date of Patent: May 20, 2025

(54) POLYAMIDEIMIDE FILM

(71) Applicants: SK Innovation Co., Ltd., Seoul (KR); SK IE Technology Co., Ltd., Seoul (KR)

(72) Inventors: Hye Ri Kim, Daejeon (KR); Min Sang Park, Daejeon (KR); Sang Yoon Park, Daejeon (KR); Ji Sang Jeong, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 670 days.

(21) Appl. No.: 16/937,125

(22) Filed: Jul. 23, 2020

(65) Prior Publication Data
US 2021/0024707 A1 Jan. 28, 2021

(30) Foreign Application Priority Data

Jul. 25, 2019 (KR) .................. 10-2019-0090066

(51) Int. Cl.
*C08J 5/18* (2006.01)
*C08G 73/14* (2006.01)

(52) U.S. Cl.
CPC ............... *C08J 5/18* (2013.01); *C08G 73/14* (2013.01); *C08J 2379/08* (2013.01)

(58) Field of Classification Search
None
See application file for complete search history.

(56) References Cited

U.S. PATENT DOCUMENTS

| 7,557,883 | B2 | 7/2009 | Kawamoto et al. |
| 7,586,571 | B2 | 9/2009 | Yoshimi et al. |
| 7,630,038 | B2 | 12/2009 | Takeda et al. |
| 7,852,436 | B2 | 12/2010 | Shimizu et al. |
| 9,442,233 | B2 | 9/2016 | Murakami et al. |
| 9,874,657 | B2 | 1/2018 | Park et al. |
| 9,939,554 | B2 | 4/2018 | Wang et al. |
| 2008/0049179 | A1 | 2/2008 | Kawamoto et al. |
| 2009/0066886 | A1 | 3/2009 | Shimizu et al. |
| 2009/0231518 | A1* | 9/2009 | Sekiguchi .............. G02B 5/305 428/424.8 |
| 2014/0072813 | A1 | 3/2014 | Fujii et al. |
| 2017/0199305 | A1* | 7/2017 | Park ..................... G02B 5/3083 |
| 2019/0101678 | A1 | 4/2019 | Iida et al. |
| 2020/0369816 | A1* | 11/2020 | Ryu ........................... C08J 5/18 |

FOREIGN PATENT DOCUMENTS

| CN | 109642968 A | 4/2019 |
| KR | 1020060014361 A | 2/2006 |
| KR | 1020080006500 A | 1/2008 |
| KR | 100822248 B1 | 4/2008 |
| KR | 1020090027137 A | 3/2009 |
| KR | 101158461 B1 | 6/2012 |
| KR | 1020140026485 A | 3/2014 |
| KR | 1020150111954 A | 10/2015 |
| KR | 1020160038271 A | 4/2016 |
| KR | 1020160091226 A | 8/2016 |
| KR | 1020170082929 A | 7/2017 |
| KR | 1020170134790 A | 12/2017 |
| KR | 1020180000863 A | 1/2018 |
| KR | 20180018307 A * | 2/2018 |
| KR | 1020180012196 A | 2/2018 |
| KR | 1020180077677 A | 7/2018 |
| KR | 1020180122625 A | 11/2018 |
| KR | 20190083302 A | 7/2019 |
| WO | 2009001799 A1 | 12/2008 |

OTHER PUBLICATIONS

Machine translation of KR 20180018307A (Year: NA).*

* cited by examiner

*Primary Examiner* — Rachel Kahn
(74) *Attorney, Agent, or Firm* — The Webb Law Firm

(57) ABSTRACT

Provided is a polyamideimide film which has an excellent uniformity of a birefringence value and may provide excellent display quality.

12 Claims, No Drawings

POLYAMIDEIMIDE FILM

CROSS-REFERENCE TO RELATED APPLICATION

This application claims priority to Korean Patent Application No. 10-2019-0090066 filed Jul. 25, 2019, the disclosure of which is hereby incorporated by reference in its entirety.

TECHNICAL FIELD

The following disclosure relates to a polyamideimide film. More particularly, the following disclosure relates to a polyamideimide film having excellent optical properties such as visibility, an optical material including the same, and a display device including the same.

BACKGROUND

In recent years, as optical technology rapidly develops, various display technologies such as a liquid crystal display and an organic light-emitting display are being suggested. A polymer material used in the display requires further advanced characteristics. For example, in the case of a liquid crystal display, as thinning, weight reduction, and enlargement of a screen area are promoted, a wider viewing angle, a higher contrast, suppression of image color change depending on a viewing angle, and uniform display are particularly important.

In general, a liquid crystal display has a configuration of polarizers installed on both sides of a liquid crystal cell, and orientation of a liquid crystal cell is changed depending on whether an actuation circuit is applied to an electric field. In addition, characteristics of transmitted light from the polarizer are accordingly changed to achieve visualization of light. Here, light path and birefringence are changed depending on an incidence angle of incident light, which is due to a liquid crystal which is an anisotropic material having different two refractive indexes.

Due to the characteristics, the liquid crystal display has a different contrast ratio which is a measure of how clearly an image is viewed depending on a viewing angle, and causes a gray scale inversion phenomenon and the like to have deteriorated visibility. Besides, the polarizer is also applied to an organic light-emitting display for improving visibility by reflection, and thus, importance of birefringence of a polymer film applied to the organic light-emitting display comes to the fore.

In order to overcome the problems, an optical compensation film for compensating optical retardation occurring by a display device is used, and an optical film such as various protective films is used therewith.

Here, as the materials of the optical compensation film used, various polymers such as polycarbonate (PC), polymethylmethacrylate (PMMA), polystyrene (PS), maleimide-based copolymers, and cellulose-based polymers are known in the prior art.

Among them, as a polymer having a relatively low degree of crystallinity and an amorphous structure, development of using polyimide having excellent transparency, thermal resistance, chemical resistance, mechanical physical properties, electrical properties, dimensional stability, and the like proceeds.

However, since polyimide has a benzene ring having a high content of polarization, it has a high optical anisotropy (birefringence value) even by a small orientation effect. In general, stress occurs in a film processing process, and orientation of a polymer chain occurs by transmitted stress.

Thus, when a slight difference in stress occurs over the total area of the film, it is difficult to implement a uniform birefringence value over the total area of the film.

As such, when an optical film having a high birefringence value and a non-uniform birefringence value is applied to a device such as a display to which a polarizer is applied, a problem of distortion of an optical design of a display occurs, and thus, manufacture of a polyamideimide film to solve the problem is currently needed.

SUMMARY

An embodiment of the present invention is directed to providing a polyamideimide film having a low in-plane birefringence value and an excellent uniformity of the in-plane birefringence value and an optical material including the same.

In particular, an embodiment of the present invention is directed to providing a high-quality display device having excellent visibility with uniform image quality and a high contrast ratio, by including the polyamideimide film.

In one general aspect, the polyamideimide film has a photoelastic coefficient in the transverse direction of less than $2.0 \times 10^{-8}$ m$^2$/N and a wavelength dispersibility in which an in-plane birefringence value ($\Delta n_{in}$) satisfies the following Relations 1 and 2:

$$1.0 < \Delta n_{in} \text{ (450 nm)}/\Delta n_{in} \text{ (550 nm)} < 1.3 \tag{1}$$

$$0.7 < \Delta n_{in} \text{ (650 nm)}/\Delta n_{in} \text{ (550 nm)} < 1.0 \tag{2}$$

wherein $\Delta n_{in}$ (450 nm), $\Delta n_{in}$ (550 nm), and $\Delta n_{in}$ (650 nm) are in-plane birefringence values measured at wavelengths of 450 nm, 550 nm, and 650 nm, respectively.

The polyamideimide film according to an exemplary embodiment of the present invention may have a wavelength dispersibility in which a birefringence value in the thickness direction ($\Delta n_{th}$) satisfies the following Relations 3 and 4:

$$0.9 < \Delta n_{th} \text{ (450 nm)}/\Delta n_{th} \text{ (550 nm)} < 1.3 \tag{3}$$

$$0.7 < \Delta n_{th} \text{ (650 nm)}/\Delta n_{th} \text{ (550 nm)} < 0.9 \tag{4}$$

wherein $\Delta n_{th}$ (450 nm), $\Delta n_{th}$ (550 nm), and $\Delta n_{th}$ (650 nm) are birefringence values in the thickness direction of the film measured at wavelengths of 450 nm, 550 nm, and 650 nm, respectively.

The polyamideimide film according to an exemplary embodiment of the present invention may satisfy the following Relation 5:

$$1.0 < \Delta n_{th} \text{ (450 nm)}/\Delta n_{th} \text{ (550 nm)} < 1.25 \tag{5}$$

wherein $\Delta n_{th}$ (450 nm) and $\Delta n_{th}$ (550 nm) are birefringence values in the thickness direction of the film measured at wavelengths of 450 nm and 550 nm, respectively.

The polyamideimide film according to an exemplary embodiment of the present invention may satisfy the following Relation 6:

$$0.72 < \Delta n_{th} \text{ (650 nm)}/\Delta n_{th} \text{ (550 nm)} < 0.87 \tag{6}$$

wherein $\Delta n_{th}$ (550 nm) and $\Delta n_{th}$ (650 nm) are birefringence values in the thickness direction of the film measured at wavelengths of 550 nm and 650 nm, respectively.

The in-plane birefringence value at a wavelength of 550 nm according to an exemplary embodiment of the present invention may be 0.1 times or less the birefringence value in the thickness direction at a wavelength of 550 nm.

An in-plane retardation value in the plane according to an exemplary embodiment of the present invention may have a uniformity of 10% or less, with respect to an area of 15 cm×15 cm.

The polyamideimide film according to an exemplary embodiment of the present invention may have a photoelastic coefficient in the transverse direction of $1.5 \times 10^{-8}$ m²/N or less.

The polyamideimide film according to an exemplary embodiment of the present invention may satisfy the following Relation 7:

$$1.1 < \Delta n_{in} (450 \text{ nm})/\Delta n_{in} (550 \text{ nm}) < 1.25 \quad (7)$$

wherein $\Delta n_{in}$ (450 nm) and $\Delta n_{in}$ (550 nm) are in-plane birefringence values measured at wavelengths of 450 nm and 550 nm, respectively.

The polyamideimide film according to an exemplary embodiment of the present invention may satisfy the following Relation 8:

$$0.72 < \Delta n_{in} (650 \text{ nm})/\Delta n_{in} (550 \text{ nm}) < 0.9 \quad (8)$$

wherein $\Delta n_{in}$ (550 nm) and $\Delta n_{in}$ (650 nm) are in-plane birefringence values measured at wavelengths of 550 nm and 650 nm, respectively.

Other features and aspects will be apparent from the following detailed description, and the claims.

DETAILED DESCRIPTION OF EMBODIMENTS

Hereinafter, the present invention will be described in more detail with reference to specific examples and exemplary embodiments. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain specific example, and are not intended to limit the present invention.

Throughout the present specification describing the present invention, unless explicitly described to the contrary, "comprising" any elements will be understood to imply further inclusion of other elements rather than the exclusion of any other elements.

In addition, the singular form used in the specification and claims appended thereto may be intended to also include a plural form, unless otherwise indicated in the context.

In the present specification, an "in-plane birefringence ($\Delta n_{in}$)" has the same meaning as birefringence in a plane, and when refractive indexes of a slow axis direction of a film (x-axis) and a fast axis direction (y-axis) are nx and ny, respectively, the in-plane birefringence means the values of nx−ny. A "birefringence in the thickness direction ($\Delta n_{th}$)" has the same meaning as an out-plane birefringence, and when nz is a refractive index in the thickness direction (z-axis), the birefringence in the thickness direction means a value of nz−(nx+ny)/2.

Here, a slow axis direction means a direction of a higher refractive index of two refractive indexes in a medium plane, and a fast axis direction means a direction of a lower refractive index of two refractive indexes in a medium plane.

In the present specification, "retardation" means a phase difference between two electric field components occurring due to a speed difference in a medium of the two electric field components orthogonal to electromagnetic waves progressing through the medium.

In the present specification, an "orientation angle" means an angle formed by a slow axis in the longitudinal direction (machine direction, MD) of a film.

In the present specification, "photoelasticity" is defined by a phenomenon in which when a load is applied a solid, change in the relative positions of molecules inside an object is represented, and the change in molecular arrangement causes a refractive index difference to generate birefringence.

The conventional polyamideimide film has excellent mechanical and thermal characteristics thereby implementing excellent durability, dimensional stability, and the like as an optical film, but it was difficult for the conventional polyamideimide film to have a birefringence uniformity over the total area of the film, due to optical properties of having a birefringence value changed even with fine external force. Thus, the present inventors found that a polyamideimide film having excellent quality with a wide viewing angle as well as uniform birefringence and retardation and an optical material including the same may be provided to provide a display device having excellent optical properties, thereby completing the present invention.

In order to achieve the above object, the polyamideimide film according to the present invention has a photoelastic coefficient in the transverse direction of less than $2.0 \times 10^{-8}$ m²/N and a wavelength dispersibility in which an in-plane birefringence value (Δnin) satisfies the following Relations 1 and 2:

$$1.0 < \Delta n_{in} (450 \text{ nm})/\Delta n_{in} (550 \text{ nm}) < 1.3 \quad (1)$$

$$0.7 < \Delta n_{in} (650 \text{ nm})/\Delta n_{in} (550 \text{ nm}) < 1.0 \quad (2)$$

wherein $\Delta n_{in}$ (450 nm), $\Delta n_{in}$ (550 nm), and $\Delta n_{in}$ (650 nm) are in-plane birefringence values measured at wavelengths of 450 nm, 550 nm, and 650 nm, respectively.

The polyamideimide film according to the present invention satisfies all of the photoelastic coefficient, the birefringence value, and the wavelength dispersibility described above, thereby preventing retardation non-uniformity by stress to implement uniform display quality. In addition, when the polyamideimide film is provided as a display device, excellent image quality in which a wide viewing angle may be provided, a high contrast ratio may be implemented, and a mura phenomenon of causing stains due to color unevenness by visibility improvement does not occur, may be provided.

The polyamideimide film according to the present invention has a photoelastic coefficient in the transverse direction of less than $2.0 \times 10^{-8}$ m²/N. Preferably, the photoelastic coefficient may be $1.5 \times 10^{-8}$ m²/N or less. Specifically, the lower limit may be $1.0 \times 10^{-12}$, preferably $1.0 \times 10^{-12}$ to $1.5 \times 10^{-8}$ m²/N.

The polyamideimide film according to the present invention may have a wavelength dispersibility in which an in-plane birefringence value ($\Delta n_{in}$) satisfies the following Relations 1 and 2:

$$1.0 < \Delta n_{in} (450 \text{ nm})/\Delta n_{in} (550 \text{ nm}) < 1.3 \quad (1)$$

$$0.7 < \Delta n_{in} (650 \text{ nm})/\Delta n_{in} (550 \text{ nm}) < 1.0 \quad (2)$$

wherein $\Delta n_{in}$ (450 nm), $\Delta n_{in}$ (550 nm), and $\Delta n_{in}$ (650 nm) are in-plane birefringence values measured at wavelengths of 450 nm, 550 nm, and 650 nm, respectively. The polyamideimide film satisfies both the photoelastic coefficient and the wavelength dispersibility described above, thereby significantly reducing optical change by external force to have excellent reliability and also implementing a uniform birefringence value over the entire film, and having an excellent uniformity, and thus, is excellent as an optical material. At the same time, the polyamideimide film provides a wide viewing angle, thereby securing excellent visibility with high image quality.

Since the polyamideimide film according to the present invention satisfies both the photoelastic coefficient and the wavelength dispersibility described above, both the birefringence uniformity and the high image quality due to a wide viewing angle may be improved.

According to an exemplary embodiment of the present invention, the photoelastic coefficient in the machine direction (MD) and the photoelastic coefficient in the transverse direction (TD) may be different from each other. Specifically, a ratio between the photoelastic coefficient in the machine direction and the photoelastic coefficient in the transverse direction may be 1.05 or more, but is not limited thereto. When the photoelastic coefficients are different depending on the direction, a sensitivity range may be widened, when the film is applied to a material of a photoreactive sensor or the like.

According to an exemplary embodiment of the present invention, for implementing better display quality, preferably, the polyamideimide film may have a wavelength dispersibility in which an in-plane birefringence value $\Delta n_{in}$) satisfies the following Relation 7:

$$1.1 < \Delta n_{in} \text{ (450 nm)} / \Delta n_{in} \text{ (550 nm)} < 1.25 \qquad (7)$$

wherein $\Delta n_{in}$ (450 nm) and $\Delta n_{in}$ (550 nm) are in-plane birefringence values measured at wavelengths of 450 nm and 550 nm, respectively.

According to an exemplary embodiment of the present invention, for implementing better display quality, the polyamideimide film may have a wavelength dispersibility in which the in-plane birefringence value ($\Delta n_{in}$) satisfies the following Relation 8:

$$0.72 < \Delta n_{in} \text{ (650 nm)} / \Delta n_{in} \text{ (550 nm)} < 0.9 \qquad (8)$$

wherein $\Delta n_{in}$ (550 nm) and $\Delta n_{in}$ (650 nm) are in-plane birefringence values measured at wavelengths of 550 nm and 650 nm, respectively.

According to an exemplary embodiment of the present invention, the polyamideimide film may have a wavelength dispersibility in which a birefringence value in the thickness direction ($\Delta n_{th}$) satisfies the following Relations 3 and 4:

$$0.9 < \Delta n_{th} \text{ (450 nm)} / \Delta n_{th} \text{ (550 nm)} < 1.3 \qquad (3)$$

$$0.7 < \Delta n_{th} \text{ (650 nm)} / \Delta n_{th} \text{ (550 nm)} < 0.9 \qquad (4)$$

wherein $\Delta n_{th}$ (450 nm), $\Delta n_{th}$ (550 nm), and $\Delta n_{th}$ (650 nm) are birefringence values in the thickness direction of the film measured at wavelengths of 450 nm, 550 nm, and 650 nm, respectively.

According to an exemplary embodiment of the present invention, for implementing an overall more uniform birefringence value and securing a wide viewing angle, preferably, the polyamideimide film may have a wavelength dispersibility in which the birefringence value in the thickness direction ($\Delta n_{th}$) satisfies the following Relation 5:

$$1.0 < \Delta n_{th} \text{ (450 nm)} / \Delta n_{th} \text{ (550 nm)} < 1.25 \qquad (5)$$

wherein $\Delta n_{th}$ (450 nm) and $\Delta n_{th}$ (550 nm) are birefringence values in the thickness direction of the film measured at wavelengths of 450 nm and 550 nm, respectively.

According to an exemplary embodiment of the present invention, for implementing an overall more uniform birefringence value and securing a wide viewing angle, preferably, the polyamideimide film may have a wavelength dispersibility in which the birefringence value in the thickness direction ($\Delta n_{th}$) satisfies the following Relation 6:

$$0.72 < \Delta n_{th} \text{ (650 nm)} / \Delta n_{th} \text{ (550 nm)} < 0.87 \qquad (6)$$

wherein $\Delta n_{th}$ (550 nm) and $\Delta n_{th}$ (650 nm) are birefringence values in the thickness direction of the film measured at wavelengths of 550 nm and 650 nm, respectively.

When the wavelength dispersibility described above is satisfied, orientation in the thickness direction is possible, thereby controlling the in-plane birefringence value and the retardation, and thus, the birefringence value and the retardation uniformity may be further improved by the orientation effect on the total area of the film.

According to an exemplary embodiment of the present invention, the in-plane birefringence value may be 0.1 times or less the birefringence value in the thickness direction. The in-plane birefringence value may be preferably 0.09 times or less, and more preferably 0.08 times or less. Specifically, the in-plane birefringence value at a wavelength of 550 nm may be 0.01 to 0.1 times, preferably 0.01 to 0.09 times the birefringence value in the thickness direction at a wavelength of 550 nm. When the in-plane birefringence value at a wavelength of 550 nm is significantly lower than the birefringence value in the thickness direction as described above, the birefringence value may be uniform over the total area of the film, and significantly improved retardation only by a low stretching ratio may be implemented. In addition, a high-quality display in which an excellent viewing angle may be secured and stains do not occur may be provided.

According to an exemplary embodiment of the present invention, a retardation value obtained by multiplying a birefringence value depending on the wavelength dispersibility by a thickness of the film also shows the above trend.

According to an exemplary embodiment of the present invention, the retardation value in the thickness direction ($R_th$) may be 1,000 to 10,000. When the film has the retardation value as described above, visibility may be significantly improved, which is excellent in providing excellent display quality.

According to an exemplary embodiment of the present invention, an in-plane retardation value in the plane may have a uniformity of 10% or less, with respect to an area of 15 cm×15 cm. The uniformity may be preferably 9% or less, and more preferably 8% or less. Specifically, the uniformity may be 0.01 to 10%, preferably 0.1 to 9%, and more preferably 0.1 to 8%. The polyamideimide film having the uniformity described above has an excellent light uniformity and prevents non-uniform portions from being formed in a screen display to secure high reliability, when being provided for a display.

According to an exemplary embodiment of the present invention, the polyimide-based film is derived from a monomer mixture including dianhydride, diamine, and aromatic diacid dichloride to be provided as a polyamideimide film including a polymerized polyamideimide resin. The dianhydride, the diamine, and the aromatic diacid dichloride are not particularly limited as long as they are commonly used materials known in the art.

According to an exemplary embodiment of the present invention, the diamine is, for example, any one or a mixture of two or more selected from aliphatic diamine, aromatic diamine, and the like.

More specifically, the aromatic diamine is not largely limited, but, for example, may be any one or a mixture of two or more selected from bis trifluoromethylbenzidine (TFDB), bis(3-aminophenyl)sulfone (3DDS), bis(4-aminophenyl)sulfone (ODDS), diaminophenylether, o-phenylenediamine (o-PDA), p-phenylenediamine (p-PDA), m-phenylenediamine (m-PDA), oxydianiline (ODA), methylenedianiline (MDA), bisaminophenylhexafluoropropane (HFDA), 1,3-bis(4-aminophenoxy)benzene (TPE-R), and the like.

The aliphatic diamine is not largely limited, but, for example, may be any one or a mixture of two or more selected from 1,4-diaminocyclohexane, 1,4-cyclohexanebis (methylamine), 4,4'-diaminodicyclohexylmethane (MCA), 4,4'-methylenebis(2-methylcyclohexylamine) (MMCA), ethylenediamine (EN), 1,3-diaminopropane (13DAP), tetramethylenediamine, 1,6-hexamethylenediamine (16DAH), 1,12-diaminododecane (112DAD), and the like.

According to an exemplary embodiment of the present invention, the dianhydride may be any one or a mixture of two or more selected from aliphatic dianhydrides, aromatic dianhydrides, and the like.

More specifically, according to an exemplary embodiment of the present invention, the aromatic dianhydride is not largely limited, but, for example, may be any one or a mixture of two or more selected from 4,4'-hexafluoroisopropylidene diphthalic anhydride (6FDA), 1,2,4,5-benzenetetracarboxylic dianhydride (PMDA), biphenyltetracarboxylic dianhydride (BPDA), benzophenonetetracarboxylic dianhydride (BTDA), 4,4'-oxydiphthalic dianhydride (ODPA), bisdicarboxyphenoxy diphenylsulfide dianhydride (BDSDA), and the like, but is not limited thereto.

The aliphatic dianhydride is not largely limited, but, for example, any one or a mixture of two or more selected from 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride, 1,2,3,4-tetracarboxycyclopentane dianhydride, and the like, may be used.

According to an exemplary embodiment, the dianhydride may be included at 5 to 80 mol, and preferably 10 to 70 mol, based on 100 mol of the diamine, to be copolymerized.

When the dianhydride is included within the above range, a polyamideimide film having excellent visibility and optical properties may be provided.

According to an exemplary embodiment of the present invention, the aromatic diacid dichloride is not largely limited, but, for example, may include any one or a mixture of two or more selected from terephthaloyl dichloride (TPC), isophthaloyl dichloride (IPC), 1,1'-biphenyl-4,4'-dicarbonyl dichloride (BPC), 1,4-naphthalenedicarboxylic dichloride (1,4-NaDC), 2,6-naphthalenedicarboxylic dichloride (2,6-NaDC), 1,5-naphthalenedicarboxylic dichloride (1,5-NaDC), and the like. Preferably, the aromatic diacid dichloride includes any one or two or more selected from terephthaloyl dichloride, isophthaloyl dichloride, and the like.

In addition, the aromatic diacid dichloride is not used by limiting it to the compounds as exemplified above, and may be used further in combination with other acid halide compounds, but it is preferred to use the aromatic diacid dichloride alone.

According to an exemplary embodiment, the aromatic diacid dichloride may be included at 20 to 95 mol, and preferably 30 to 90 mol, based on 100 mol of the diamine, to be copolymerized.

The polyamideimide film produced from the above composition may have excellent mechanical properties and thermal resistance, also provide excellent display quality even at a high temperature, and provide optical properties maintaining high transparency. In addition, the film may have more uniform birefringence value and retardation value, and have excellent quality at various angles with a significantly wide viewing angle.

According to an exemplary embodiment of the present invention, the polyamideimide film may be produced by adjusting a drying temperature and time in a first drying process, after a solution casting process. For example, drying may be performed at a drying temperature of 80° C. for 3 minutes. Preferably, drying may be performed at a temperature of 80 to 160° C. for 3 to 15 minutes. Specifically, drying may be performed at one point temperature in a range of 80 to 160° C. or performed by drying at a first temperature and then at a second temperature, but the method is not particularly limited as long as the temperature and the time are satisfied. When the film is dried as described above, a wide viewing angle may be provided, a high contrast ratio may be implemented, and visibility may be improved to provide excellent image quality.

According to an exemplary embodiment of the present invention, the film polyamideimide film may be subjected to a stretching process. The stretching may be performed at 1 to 30%, relative to each direction of the transverse direction (TD) and the machine direction (MD) of the polyamideimide film before stretching. Preferably, the stretching may be performed at 1 to 20%. When the stretching is performed as described above, the dimensional stability of the polyamideimide film may be improved and a film having better quality may be provided.

According to an exemplary embodiment of the present invention, the stretching may be performed at a stretching ratio (ratio of transverse direction/machine direction elongation) depending on TD and MD of 1.5 or less. Specifically, the stretching ratio may be 0.8 to 1.5, preferably 0.9 to 1.4, and more preferably 0.9 to 1.35. When the stretching ratio is as described above, retardation non-uniformity may be prevented by stress to implement uniform display quality. Preferably, the stretching may be performed simultaneously with second drying. Specifically, the stretching may be performed in a tenter or the like which allows a second drying process simultaneously with stretching. As such, when the stretching and the second drying process are performed at the same time, excellent display quality in which a light uniformity is better and non-uniform portions hardly form on a screen display, may be implemented, as compared with the case in which only the stretching is performed or only the second drying process is performed.

According to an exemplary embodiment of the present invention, a stretching process performed simultaneously with the second drying process may provide one or more, preferably two or more, more preferably three or more, and most preferably four or more stretching areas obtained by different drying and stretching conditions during the process. Specifically, when three or more stretching areas are formed, second drying and stretching are performed while the film is moved to each area, a wide viewing angle is secured while fine non-uniformity on the surface is significantly reduced, and excellent image quality may be provided.

More specifically, the stretching process may be performed by adjusting a drying temperature and an elongation in three or more stretching areas to produce the film. For example, in the stretching process performed in three or more areas, the drying temperature in a first area may be 140 to 210° C., the drying temperature in a second area may be 150 to 250° C., and the drying temperature in a third area may be 180 to 300° C., simultaneously with stretching. Preferably, the drying temperature in the first area may be 140 to 200° C., the drying temperature in the second area may be 160 to 240° C., and the drying temperature in the third area may be 190 to 280° C. Here, in the stretching process, stretching and second drying are performed while the film sequentially passes through the first to third areas. When the drying temperature is configured at the time of stretching, Relations 1 and 2 may be satisfied, the birefringence value and the retardation uniformity are excellent, and an excellent viewing angle is secured to provide a high-quality display.

Preferably, as another exemplary embodiment, the stretching process may be performed by adjusting a drying temperature and an elongation in four or more stretching areas to produce the film. For example, in the stretching process performed in four or more areas, the drying temperature in a first area may be 140 to 210° C., the drying temperature in a second area may be 150 to 250° C., the drying temperature in a third area may be 180 to 300° C., and the drying temperature in a fourth area may be 200 to 280° C., simultaneously with stretching. Preferably, the drying temperature in the first area may be 140 to 200° C., the drying temperature in the second area may be 160 to 240° C., the drying temperature in the third area may be 190 to 280° C., and the drying temperature in the fourth area may be 200 to 270° C. Here, in the stretching process, stretching and second drying are performed while the film sequentially passes through the first to fourth areas. When the drying temperature is configured at the time of stretching, Relations 1 and 2 may be satisfied, high image quality having a high definition and no image distortion phenomenon may be provided.

More preferably, in order to improve a retardation uniformity over the total area of the film, third area or higher among the first area to the fourth area may have a sequentially increased drying temperature. Mote preferably, when the film passes through from the third area to the fourth area, the drying temperature may be the same or decreased.

According to an exemplary embodiment of the present invention, the stretching process performed simultaneously with the second drying process may be performed for a total of 1 to 20 minutes, preferably 5 to 20 minutes, and more preferably 7.5 to 15 minutes, but is not limited thereto. Specifically, when areas of the stretching process are three or more, the drying process may be performed for 1 to 10 minutes, preferably 1 to 6 minutes for each area, but is not limited thereto.

According to an exemplary embodiment of the present invention, when the number of areas of the stretching process is three or more, the following Equation 1 and Equation 2 may be satisfied:

$$5 \leq T_2 - T_1 \leq 50 \tag{1}$$

$$5 \leq T_3 - T_2 \leq 100 \tag{2}$$

wherein $T_1$ is a drying temperature (° C.) in a first area during a stretching process of a polyamideimide film, $T_2$ is a drying temperature (° C.) in a second area during a stretching process of a polyamideimide film, and $T_3$ is a drying temperature (° C.) in a third area during a stretching process of a polyamideimide film.

Preferably, Equation 1 may satisfy 10 to 35 and Equation 2 may satisfy 5 to 80.

As another exemplary embodiment, the stretching process may satisfy Equations 1 and 2, and satisfy the following Equation 3, in the case of four areas or more:

$$-80 \leq T_4 - T_3 \leq 50 \tag{3}$$

wherein $T_3$ is a drying temperature (° C.) of a third area during the stretching process of the polyamideimide film, and $T_4$ is a drying temperature (° C.) of a fourth area during the stretching process of the polyamideimide film.

Preferably, the above Equation 3 may satisfy −70 to 5, and more preferably −70 to 0.

When the second drying temperature during the stretching process satisfies Equations 1 and 2 or Equations 1 to 3, as described above, Relations 1 and 2 may be satisfied, the in-plane birefringence value may have a significantly lower value than the birefringence value in the thickness direction, the value may be uniform over the total area of the film, and an excellent viewing angle may be secured to provide a high-quality display.

According to an exemplary embodiment of the present invention, the polyamideimide film may have a thickness of 20 to 200 μm. Preferably, the transparent film may have a thickness of 20 to 150 μm, and more preferably 20 to 100 μm. When the film has the thickness described above, Relations 1 and 2 may be satisfied, the uniformity of the birefringence value and the retardation is excellent, a high contrast ratio due to a high viewing angle may be implemented, and a distortion phenomenon of an image may be suppressed by a high definition.

Another embodiment of the present invention is an optical material including the polyamideimide film described above.

The polyamideimide film according to the present invention is excellent as an optical material which may provide excellent image quality having an excellent uniformity of a birefringence value and retardation, implementing a high contrast ratio due to a high viewing angle to have a high definition, having no distortion phenomenon of an image.

The polyamideimide film according to the present invention may be applied to a wide range of fields, such as heat-resistant advanced materials such as automotive materials, aviation materials, and spacecraft materials; and electronic materials such as insulating coating materials, insulating films, and an electrode protective film of semiconductors and TFT-LCD, but, preferably, may be applied to a display field such as a liquid crystal display device as an optical material.

Specifically, the polyamideimide film may be applied to a display field as various optical materials selected from a cover window film, a protective film, a retardation film, a diffusion film, a flexible substrate, a sealant, a polarizer, a touch panel substrate, and the like.

Another embodiment of the present invention is a polarizer including the polyamideimide film described above.

When the polyamideimide film is included as described above, a polarizer securing a wide viewing angle and implementing a high image quality may be provided.

According to an exemplary embodiment of the present invention, the polarizer may be implemented in various shapes such as a linear polarizer or a circular polarizer without being limited to a particular shape.

According to an exemplary embodiment of the present invention, the polarizer may be utilized in various fields. For example, the polarizer may be used as a mobile communication terminal, a smartphone, other mobile devices, a display device, an electronic blackboard, an outdoor electronic display, and various displays.

Another embodiment of the present invention is a display device including the polarizer described above or the optical material described above. When the display device includes the polyamideimide film, excellent visibility may be implemented. In addition, even in the case in which light comes out from a display panel not only in a vertical direction but also in various directions, excellent image quality may be implemented, and visibility may be significantly improved as compared with the conventional display device.

According to an exemplary embodiment of the present invention, the display device is not particularly limited as long as excellent optical properties are required in the field, and the display device may be applied to the field selected from a liquid crystal display, an organic EL display, electronic paper, and the like. In addition, the display panel may be selected depending on the application field and provided. Specifically, for example, the display device may include any one or two or more selected from various image display devices such as a liquid crystal display device, an electroluminescence display device, a plasma display device, and a field emission display device, and the like, but is not limited thereto.

The polyamideimide film according to the present invention, the optical material including the same, and the display device including the same will be described in detail by the Examples.

However, the following Examples are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain exemplary embodiment, and are not intended to limit the present invention.

Further, unless otherwise stated, the unit of added materials herein may be wt %.

The physical properties of the present invention were measured as follows:

(1) Photoelastic Coefficient

Photoelasticity was obtained by measuring retardation change of a tensioned portion, with respect to stress occurring when a specimen is tensioned using Microtest Tensile Stage available from Deben. A photoelastic coefficient was obtained by cutting a specimen into a size of 2 cm×7 cm, placing the specimen on the bottom of thin jaws of a tensile stage, covering the specimen with thick jaws and fixing it with a screw, and then measuring photoelasticity. Here, the film was fixed tightly, and after fixing was complete, a distance between close jaws was fixed at 20 mm. Thereafter, the specimen was slowly tensioned, and a slope of in-plane birefringence value ($\Delta n_{in}$) when 1 to 3% increased was calculated to record the photoelastic coefficient. When stresses occurring when 1% and 3% stretched are referred to as σ1 and σ2, respectively, and the in-plane birefringences at this time are referred to as $\Delta n_1$ and $\Delta n_2$, the photoelastic coefficient is defined as follows.

$$[\Delta n_2 - \Delta n_1]/[\sigma_2 - \sigma_1]$$

(2) Measurement of Birefringence and Retardation Values

Birefringence value: measured using Axoscan equipment available from Axometrics. The birefringence value was obtained by measuring values of light at a wavelengths of 450 nm, 550 nm, and 650 nm. The in-plane birefringence ($\Delta n_{in}$) and the birefringence in the thickness direction ($\Delta n_{th}$) are calculated by the following equation:

$$\Delta n_{in} = nx - ny$$

($\Delta n_{in}$: in-plane birefringence, nx: refractive index in the slow axis, ny: refractive index in the fast axis)

$$\Delta n_{th} = nz - (nx+ny)/2$$

($\Delta n_{th}$: birefringence in the thickness direction, nx: refractive index in the slow axis, ny: refractive index in the fast axis, nz: refractive index in the thickness direction)

Retardation: using Axoscan equipment available from Axometrics. The retardation was measured for each incident angle (0), which was represented by detecting how certain linear polarization occurring from a Polarization State Generator (PSG) is changed while passing through a film to be measured, from a Polarization State Analyzer (PSA).

(3) Measurement of Uniformity of In-Plane Retardation Value

The uniformity of the in-plane retardation was measured using Axoscan equipment equipped with XY-Mapping Stage available from Axometrics. Here, a $R_{in}$ value and an orientation angle may be measured, and the object to be measured for the uniformity is the $R_{in}$ value. The size of the specimen at the time of measurement was 15 cm×15 cm, measurement was performed at 100 points of 10 EA×10 EA as a measurement point, and the uniformity (%) was confirmed as follows.

As the retardation value, the $R_{in}$ value measured using an XY-Mapping Stage was used as it was, and when the maximum value of $R_{in}$ is $R_{max}$, the minimum value of $R_{in}$ is $R_{min}$, and the average value is $R_{ave}$, the uniformity is defined as $\{(R_{max}-R_{min})/(R_{ave}\times 2)\}\times 100$.

(4) Evaluation of Final Film Quality

For evaluation of final film quality, when a display in which the polarizer and the manufactured optical film were joined was visually observed at a viewing angle of 165° C., the display was determined to be OK or NG, depending on whether the color was changed and image stains were viewed.

(5) Residual Solvent Content

For a residual solvent content, a value obtained by subtracting a weight at 370° C., A370 from a weight at 150° C., A150 using TGA (Discovery available from TA) was determined as a residual solvent content in the film. Here, measurement conditions involved heating up to 400° C. at a heating rate of 30° C./min, and weight change in a section from 150 to 370° C. was measured.

Preparation Example 1

[Mole Ratio of TFMB:6FDA:TPC=100:14:86]

Dimethylacetamide (DMAc) and 2,2'-bis(trifluoromethyl)-benzidine (TFMB) were added to a reactor under a nitrogen atmosphere and sufficiently stirred, and then 4,4'-hexafluoroisopropylidene diphthalic anhydride (6FDA) was added thereto and sufficient stirring was performed until the reactant was dissolved. Thereafter, terephthaloyl dichloride (TPC) was introduced and stirring was performed for 6 hours to carry out dissolution and reaction, thereby producing a polyamic acid resin composition. Here, the amount of each monomer was TFMB:6FDA:TPC=100:14:86 as a mole ratio, and the temperature of the reactor was maintained at 30° C. The viscosity of the finally obtained polyamic acid resin composition was 33,000 cps. Subsequently, pyridine and acetic anhydride were added to the polyamic acid resin composition at 2.5-fold of the total introduction amount of the dianhydride, and stirring was performed at 60° C. for 1 hour to produce a polymerization solution 1.

Thereafter, the polymerization solution 1 was precipitated in an excessive amount of methanol and filtered to obtain a solid content, which was vacuum-dried at 50° C. for 6 hours or more to obtain polyamideimide. The weight average molecular weight of the finally obtained polyamideimide was 106,000 g/mol.

Preparation Example 2

[Mole Ratio of TFMB:CBDA:IPC=100:60:40]

Dimethylacetamide (DMAc) and 2,2'-bis(trifluoromethyl)-benzidine (TFMB) were added to a reactor under a nitrogen atmosphere and sufficiently stirred, and then 4,4'-cyclobutanetetracarboxylic dianhydride (CBDA) was added thereto and sufficient stirring was performed until the reactant was dissolved. Thereafter, isophthaloyl dichloride (IPC) was added and stirring was performed for 6 hours to carry out dissolution and reaction, thereby producing a polyamic acid resin composition. Here, the amount of each monomer was TFMB:CBDA:IPC=100:60:40 as a mole ratio, and the temperature of the reactor was maintained at 30° C. The viscosity of the finally obtained polyamic acid resin composition was 90,000 cps. Subsequently, pyridine and acetic anhydride were added to the polyamic acid resin composition at 2.5-fold of the total introduction amount of the dianhydride, and stirring was performed at 60° C. for 1 hour to produce a polymerization solution 2.

Thereafter, the polymerization solution 2 was precipitated in an excessive amount of methanol and filtered to obtain a solid content, which was vacuum-dried at 50° C. for 6 hours or more to obtain polyamideimide. The weight average molecular weight of the finally obtained polyamideimide was 310,000 g/mol.

Preparation Example 3

[Mole Ratio of TFMB:CBDA:IPC=100:40:60]

Dimethylacetamide (DMAc) and 2,2'-bis(trifluoromethyl)-benzidine (TFMB) were added to a reactor under a nitrogen atmosphere and sufficiently stirred, and then 4,4'-cyclobutanetetracarboxylic dianhydride (CBDA) was added thereto and sufficient stirring was performed until the reactant was dissolved. Thereafter, isophthaloyl dichloride (IPC) was added and stirring was performed for 6 hours to carry out dissolution and reaction, thereby producing a polyamic acid resin composition. Here, the amount of each monomer was TFMB:CBDA:IPC=100:40:60 as a mole ratio, and the temperature of the reactor was maintained at 30° C. The viscosity of the finally obtained polyamic acid resin composition was 68,000 cps. Subsequently, pyridine and acetic anhydride were added to the polyamic acid resin composition at 2.5-fold of the total introduction amount of the dianhydride, and stirring was performed at 60° C. for 1 hour to produce a polymerization solution 3.

Thereafter, the polymerization solution 3 was precipitated in an excessive amount of methanol and filtered to obtain a solid content, which was vacuum-dried at 50° C. for 6 hours or more to obtain polyamideimide. The weight average molecular weight of the finally obtained polyamideimide was 180,000 g/mol.

Example 1

The polymerization solution 1 was cast on a Yellow PI (Upilex-S 125 available from Ube) film at room temperature using a slot die, and dried for 7 minutes in a drying oven at 140° C., thereby obtaining a primary dry film having a thickness of 70 μm and a width of 300 mm. This film was subjected to stretching conditions shown in Table 1 to produce a transparent PAI film having a residual solvent content of 1.9 wt %.

Example 2

The polymerization solution 1 was cast on a glass substrate at room temperature using an applicator, and dried at 90° C. (2 minutes)-120° C. (3 minutes)-140° C. (2 minutes), thereby obtaining a primary dry film having a thickness of 72 μm and a width of 300 mm. This film was subjected to second drying and stretching conditions shown in Table 1 to produce a transparent PAI film having a residual solvent content of 2.3 wt %.

Example 3

The polymerization solution 1 was cast on a Yellow PI film at 40° C. using a slot die, and dried for 7 minutes in a drying oven at 140° C., thereby obtaining a primary dry film having a thickness of 73 μm and a width of 300 mm. This film was subjected to second drying and stretching conditions shown in Table 1 to produce a transparent PAI film having a residual solvent content of 2.0 wt %.

Example 4

The polymerization solution 2 was cast on a Yellow PI film at room temperature using a slot die, and dried for 7 minutes in a drying oven at 140° C., thereby obtaining a primary dry film having a thickness of 68 μm and a width of 300 mm. This film was subjected to second drying and stretching conditions shown in Table 1 to produce a transparent PAI film having a residual solvent content of 1.78 wt %.

Example 5

The polymerization solution 2 was cast on a glass substrate at room temperature using an applicator, and dried at 90° C. (2 minutes)-120° C. (3 minutes)-140° C. (2 minutes), thereby obtaining a primary dry film having a thickness of 69 μm and a width of 300 mm. This film was subjected to second drying and stretching conditions shown in Table 1 to produce a transparent PAI film having a residual solvent content of 2.2 wt %.

Example 6

The polymerization solution 2 was cast on a Yellow PI film at 40° C. using a slot die, and dried for 7 minutes in a drying oven at 140° C., thereby obtaining a primary dry film having a thickness of 71 μm and a width of 300 mm. This film was subjected to second drying and stretching conditions shown in Table 1 to produce a transparent PAI film having a residual solvent content of 2.1 wt %.

Example 7

The polymerization solution 3 was cast on a Yellow PI film at room temperature using a slot die, and dried for 7 minutes in a drying oven at 140° C., thereby obtaining a primary dry film having a thickness of 67 μm and a width of 300 mm. This film was subjected to second drying and stretching conditions shown in Table 1 to produce a transparent PAI film having a residual solvent content of 1.8 wt %.

Example 8

The polymerization solution 3 was cast on a Yellow PI film at 40° C. using a slot die, and dried for 7 minutes in a drying oven at 140° C., thereby obtaining a primary dry film having a thickness of 70 μm and a width of 300 mm. This film was subjected to second drying and stretching conditions shown in Table 1 to produce a transparent PAI film having a residual solvent content of 2.1 wt %.

Comparative Example 1

A primary dry film was produced in the same manner as in Example 1, and then subjected to secondary drying and stretching in the manner shown in the following Table 1 to produce a film having a residual solvent content of 2.1 wt %.

Comparative Example 2

A primary dry film was produced in the same manner as in Example 2, and then subjected to secondary drying and stretching in the manner shown in the following Table 1 to produce a film having a residual solvent content of 2.3 wt %.

Comparative Example 3

A primary dry film was produced in the same manner as in Example 3, and then subjected to secondary drying and stretching in the manner shown in the following Table 1 to produce a film having a residual solvent content of 3.5 wt %.

Comparative Example 4

The polymerization solution 2 was cast on a glass substrate at room temperature using an applicator, and dried at 120° C. to 20 minutes, thereby obtaining a primary dry film having a thickness of 64 pm and a width of 300 mm. This film was subjected to second drying and stretching conditions shown in Table 1 to produce a transparent PAI film having a residual solvent content of 1.85 wt %.

Comparative Example 5

The polymerization solution 3 was cast on a Yellow PI film at room temperature using an applicator, and dried at 140° C. for minutes, thereby obtaining a primary dry film having a thickness of 78 μm and a width of 300 mm. This film was subjected to second drying and stretching conditions shown in Table 1 to produce a transparent PAI film having a residual solvent content of 2.1 wt %.

Comparative Example 6

A primary dry film was produced in the same manner as in Example 4, and then subjected to secondary drying and stretching in the manner shown in the following Table 1 to produce a transparent PI film having a residual solvent content of 1.98 wt %.

Specifically, in Examples 1 to 8 and Comparative Examples 1 to 6, the secondary drying and stretching conditions were as shown in the following Table 1, production was performed by performing drying and stretching simultaneously in a tenter, and thereafter, the optical properties of transparent PAI films were specified and are shown in the following Tables 2 and 3. Here, the numerical values (%) described as stretching conditions in the following Table 1 mean a ratio (%) of a maximum film width in each area relative to a width when entering the first area.

TABLE 1

| | Stretching conditions in TD/second drying conditions (passage time) | | | | Stretching ratio (MD/TD) |
| --- | --- | --- | --- | --- | --- |
| | First area | Second area | Third area | Fourth area | |
| Example 1 | 100%/160° C. (2 minutes) | 103%/180° C. (2 minutes) | 104%/250° C. (2 minutes) | 101%/240° C. (2 minutes) | 1.10 |
| Example 2 | 100%/150° C. (2 minutes) | 102%/170° C. (2 minutes) | 103%/240° C. (3 minutes) | 102%/220° C. (2 minutes) | 1.10 |
| Example 3 | 100%/185° C. (1 minute) | 103%/210° C. (2 minutes) | 105%/265° C. (3 minutes) | 104%/265° C. (2 minutes) | 1.08 |
| Example 4 | 95%/175° C. (2 minutes) | 102%/210° C. (2 minutes) | 100%/275° C. (3.5 minutes) | 100%/215° C. (1 minute) | 1.20 |
| Example 5 | 98%/170° C. (2 minutes) | 105%/190° C. (2 minutes) | 103%/245° C. (2.5 minutes) | 103%/235° C. (2.5 minutes) | 1.30 |
| Example 6 | 100%/195° C. (1.5 minutes) | 103%/220° C. (2 minutes) | 102%/225° C. (5 minutes) | 101%/210° C. (3 minutes) | 1.15 |
| Example 7 | 100%/165° C. (2 minutes) | 100%/185° C. (2 minutes) | 100%/195° C. (2 minutes) | 100%/205° C. (2 minutes) | 1.20 |
| Example 8 | 100%/175° C. (1.5 minutes) | 102%/195° C. (2.5 minutes) | 101%/205° C. (5 minutes) | 100%/205° C. (5 minutes) | 1.10 |
| Comparative Example 1 | 100%/220° C. (10 minutes) | — | — | — | 1.15 |
| Comparative Example 2 | 100%/130° C. (5 minutes) | 105%/260° C. (3 minutes) | — | — | 1.20 |
| Comparative Example 3 | 95%/195° C. (3 minutes) | 100%/210° C. (4 minutes) | — | — | 0.30 |
| Comparative Example 4 | 80%/230° C. (0.7 minutes) | 85%/300° C. (1.3 minutes) | 85%/290° C. (1.5 minutes) | 85%/280° C. (1.5 minutes) | 1.20 |

TABLE 1-continued

| | Stretching conditions in TD/second drying conditions (passage time) | | | | Stretching ratio |
|---|---|---|---|---|---|
| | First area | Second area | Third area | Fourth area | (MD/TD) |
| Comparative Example 5 | 100%/160° C. (0.5 minutes) | 105%/260° C. (1.5 minutes) | 103%/280° C. (2.5 minutes) | 101%/270° C. (2.5 minutes) | 2.30 |
| Comparative Example 6 | 95%/240° C. (1.5 minutes) | 110%/280° C. (2 minutes) | 85%/290° C. (1 minute) | 80%/290° C. (1 minute) | 1.20 |

100%: based on a transverse direction (TD) when entering the first area.

TABLE 2

| | Photoelastic coefficient in the transverse direction (m$^2$/N) | $\Delta n_{in}$ (450)/ $\Delta n_{in}$ (550) | $\Delta n_{in}$ (650)/ $\Delta n_{in}$ (550) | $\Delta n_{th}$ (450)/ $\Delta n_{th}$ (550) | $\Delta n_{th}$ (650)/ $\Delta n_{th}$ (550) | $\Delta n_{th}$ (550)/ $\Delta n_{th}$ (550) |
|---|---|---|---|---|---|---|
| Example 1 | $1.0 \times 10^{-10}$ | 1.24 | 0.75 | 1.18 | 0.82 | 0.07 |
| Example 2 | $1.5 \times 10^{-10}$ | 1.15 | 0.84 | 1.15 | 0.86 | 0.06 |
| Example 3 | $1.5 \times 10^{-10}$ | 1.29 | 0.74 | 1.21 | 0.78 | 0.06 |
| Example 4 | $4.5 \times 10^{-9}$ | 1.23 | 0.74 | 1.24 | 0.81 | 0.03 |
| Example 5 | $2.3 \times 10^{-11}$ | 1.18 | 0.82 | 1.16 | 0.84 | 0.05 |
| Example 6 | $1.5 \times 10^{-8}$ | 1.21 | 0.77 | 1.20 | 0.80 | 0.04 |
| Example 7 | $1.5 \times 10^{-10}$ | 1.24 | 0.75 | 1.18 | 0.82 | 0.07 |
| Example 8 | $3.2 \times 10^{-11}$ | 1.22 | 0.78 | 1.23 | 0.81 | 0.09 |
| Comparative Example 1 | $1.5 \times 10^{-10}$ | 1.35 | 0.68 | 1.28 | 0.78 | 0.09 |
| Comparative Example 2 | $7.2 \times 10^{-5}$ | 1.42 | 0.62 | 1.31 | 0.69 | 0.07 |
| Comparative Example 3 | $1.2 \times 10^{-10}$ | 1.33 | 0.7 | 1.31 | 0.75 | 0.08 |
| Comparative Example 4 | $1.5 \times 10^{-9}$ | 1.28 | 0.68 | 1.20 | 0.71 | 0.12 |
| Comparative Example 5 | $2.0 \times 10^{-8}$ | 1.25 | 0.72 | 1.23 | 0.79 | 0.13 |
| Comparative Example 6 | $3.0 \times 10^{-7}$ | 1.39 | 0.61 | 1.33 | 0.65 | 0.18 |

TABLE 3

| | $R_{in}$ uniformity (%) | Final quality evaluation |
|---|---|---|
| Example 1 | 5.0 | OK |
| Example 2 | 3.0 | OK |
| Example 3 | 4.5 | OK |
| Example 4 | 7.0 | OK |
| Example 5 | 4.0 | OK |
| Example 6 | 8.5 | OK |
| Example 7 | 6.5 | OK |
| Example 8 | 9.5 | OK |
| Comparative Example 1 | 6.3 | NG |
| Comparative Example 2 | 12.5 | NG |
| Comparative Example 3 | 10.6 | NG |
| Comparative Example 4 | 11.2 | NG |
| Comparative Example 5 | 12.5 | NG |
| Comparative Example 6 | 13.8 | NG |

As shown in the above Table 2, it was confirmed that the polyamideimide film according to the present invention satisfied Relations 1 and 2, and furthermore, satisfied Relations 1 to 4, thereby providing a high-quality display having uniform birefringence values and retardation, as shown in Table 3. Specifically, it was confirmed that the polyamideimide film had a high definition and was excellent as an optical material which may prevent an image distortion phenomenon. Furthermore, this may be achieved by adjusting a drying temperature for each area during the stretching process.

Thus, the polyamideimide film according to the present invention has the significantly lower in-plane birefringence value than the birefringence value in the thickness direction, thereby having a uniform value over the total area of the film, and is excellent as an optical material which may provide a high-quality display.

The polyamideimide film according to the present invention may implement a uniform birefringence value over the total area of the film while having a low birefringence value.

In addition, the polyamideimide film according to the present invention may provide excellent display quality even under a high temperature and high humidity environment.

In addition, an optical material including the polyamideimide film according to the present invention has significantly reduced changes in optical properties by external force, thereby having high reliability.

In addition, a display device including the polyamideimide film according to the present invention may provide high image quality with a wide viewing angle.

In addition, the display device including the polyamideimide film according to the present invention has an excellent screen contrast ratio and uniform display image quality.

Hereinabove, although the present invention has been described by the specific matters and specific exemplary embodiments, they have been provided only for assisting in the entire understanding of the present invention. Therefore, the present invention is not limited to the exemplary embodiments, and various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polyamideimide film having a photoelastic coefficient in a transverse direction of less than $2.0 \times 10^{-8}$ m2/N and a wavelength dispersibility in which an in-plane birefringence value ($\Delta n_{in}$) satisfies the following Relations 1 and 2:

$$1.0 < \Delta n_{in}\ (450\ nm)/\Delta n_{in}\ (550\ nm) < 1.3 \quad \text{[Relation 1]}$$

$$0.7 < \Delta n_{in}\ (650\ nm)/\Delta n_{in}\ (550\ nm) < 1.0 \quad \text{[Relation 2]}$$

wherein $\Delta n_{in}$ (450 nm), $\Delta n_{in}$ (550 nm), and $\Delta n_{in}$ (650 nm) are in-plane birefringence values measured at wavelengths of 450 nm, 550 nm, and 650 nm, respectively, and in which a birefringence value in a thickness direction ($\Delta$ni) satisfies the following Relations 3 and 4:

$$0.9 < \Delta n_{th}\ (450\ nm)/\Delta n_{th}\ (550\ nm) < 1.3 \quad \text{[Relation 3]}$$

$$0.7 < \Delta n_{th}\ (650\ nm)/\Delta n_{th}\ (550\ nm) < 0.9 \quad \text{[Relation 4]}$$

wherein $\Delta n_{th}$ (450 nm), $\Delta n_{th}$ (550 nm), and $\Delta n_{th}$ (650 nm) are birefringence values in the thickness direction of the film measured at wavelengths of 450 nm, 550 nm, and 650 nm, respectively, the polyamideimide is derived from a monomer mixture consisting of dianhydride, diamine, and aromatic diacid dichloride, wherein the diamine consists of 2,2'-bis(trifluoromethyl)-benzidine, the dianhydride consists of 4,4'-hexafluoroisopropylidene diphthalic anhydride or 1,2,3,4-cyclobutanetetracarboxylic dianhydride, and the diacid dichloride consists of terephthaloyl dichloride or isophthaloyl dichloride, and the polyamideimide is dried in a first drying process and is simultaneously stretched and dried over three or more stretching areas in a second drying process, the second drying process performed for a total of 1 to 20 minutes and satisfies the following Equation 1 and Equation 2:

$$5 \leq T_2 - T_1 \leq 50 \quad \text{(Equation 1)}$$

$$5 \leq T_3 - T_2 \leq 100 \quad \text{(Equation 2)}$$

wherein $T_1$ is a drying temperature (° C.) in a first area during a stretching process of the polyamideimide film, $T_2$ is a drying temperature (° C.) in a second area during a stretching process of the polyamideimide film, and $T_3$ is a drying temperature (° C.) in a third area during a stretching process of the polyamideimide film.

2. The polyamideimide film of claim 1, wherein the polyamideimide film satisfies the following Relation 5:

$$1.0 < \Delta n_{th}\ (450\ nm)/\Delta n_{th}\ (550\ nm) < 1.25 \quad \text{[Relation 5]}$$

wherein $\Delta n_{th}$ (450 nm) and $\Delta n_{th}$ (550 nm) are birefringence values in the thickness direction of the film measured at wavelengths of 450 nm and 550 nm, respectively.

3. The polyamideimide film of claim 1, wherein the polyamideimide film satisfies the following Relation 6:

$$0.72 < \Delta n_{th}\ (650\ nm)/\Delta n_{th}\ (550\ nm) < 0.87 \quad \text{[Relation 6]}$$

wherein $\Delta n_{th}$ (550 nm) and $\Delta n_{th}$ (650 nm) are birefringence values in the thickness direction of the film measured at wavelengths of 550 nm and 650 nm, respectively.

4. The polyamideimide film of claim 1, wherein the in-plane birefringence value at a wavelength of 550 nm is 0.1 times or less the birefringence value in the thickness direction at a wavelength of 550 nm.

5. The polyamideimide film of claim 1, wherein an in-plane retardation value in the plane has a uniformity of 10% or less, with respect to an area of 15 cm×15 cm of the film.

6. The polyamideimide film of claim 1, wherein the photoelastic coefficient in the transverse direction is 1.5×$10^{-8}$ m$^2$/N or less.

7. The polyamideimide film of claim 1, wherein the polyamideimide film satisfies the following Relation 7:

$$1.1 < \Delta n_{in}\ (450\ nm)/\Delta n_{in}\ (550\ nm) < 1.25 \quad \text{[Relation 7]}$$

wherein $\Delta n_{in}$ (450 nm) and $\Delta n_{in}$ (550 nm) are in-plane birefringence values measured at wavelengths of 450 nm and 550 nm, respectively.

8. The polyamideimide film of claim 1, wherein the polyamideimide film satisfies the following Relation 8:

$$0.72 < \Delta n_{in}\ (650\ nm)/\Delta n_{in}\ (550\ nm) < 0.9 \quad \text{[Relation 8]}$$

wherein $\Delta n_{in}$ (550 nm) and $\Delta n_{in}$ (650 nm) are in-plane birefringence values measured at wavelengths of 550 nm and 650 nm, respectively.

9. The polyamideimide film of claim 1, wherein in the second drying process performed in three or more areas, the drying temperature in a first area is 140 to 210° C., a drying temperature in a second area is 150 to 250° C., and a drying temperature in a third area is 180 to 300° C.

10. The polyamideimide film of claim 1, wherein the second drying process is performed in four areas or more, the stretching process satisfies Equation 1, Equation 2 and following Equation 3:

$$-80 \leq T_4 - T_3 \leq 50 \quad \text{(Equation 3)}$$

wherein $T_3$ is a drying temperature (° C.) of a third area during the stretching process of the polyamideimide film, and $T_4$ is a drying temperature (° C.) of a fourth area during the stretching process of the polyamideimide film.

11. The polyamideimide film of claim 10, wherein in the second drying process performed in four areas or more, the drying temperature in a first area is 140 to 210° C., a drying temperature in a second area is 150 to 250° C., a drying temperature in a third area is 180 to 300° C., and a drying temperature in a fourth area is 200 to 270° C.

12. The polyamideimide film of claim 1, wherein stretching is performed at 1 to 30% relative to each direction of the transverse direction (TD) and the machine direction (MD) of the polyamideimide film before stretching.

* * * * *